Patented July 19, 1932

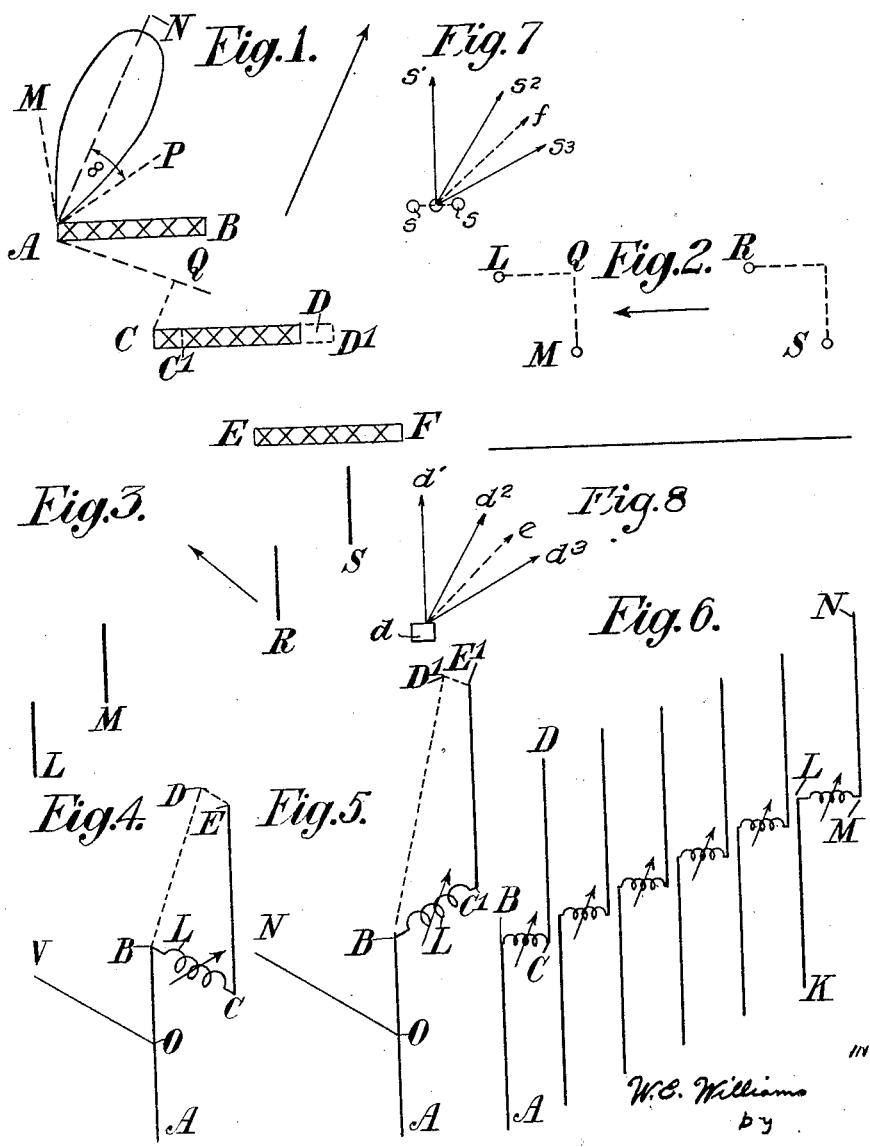

1,867,958

UNITED STATES PATENT OFFICE

WILLIAM EWART WILLIAMS, OF BROMLEY, ENGLAND, ASSIGNOR, BY MESNE ASSIGNMENTS, TO BRITISH RADIOSTAT CORPORATION, LIMITED, A CORPORATION OF CANADA

DIRECTIONAL AERIAL FOR TRANSMISSION AND RECEPTION OF ELECTROMAGNETIC WAVES

Application filed February 13, 1929, Serial No. 339,693, and in Great Britain February 13, 1928.

This invention relates to directional aerials for the transmission and reception of electromagnetic (wireless) waves and has for its object a simple and efficient means of obtaining directional effects therewith.

In general directional aerial systems have heretofore been obtained by combinations or arrays of vertical wires. For transmission work these are sometimes fed in phase so that the main directional effect is perpendicular to the plane of the array. In accordance with Blondel's application of Young's interference principle by introducing phase differences between the successive elements the direction of the main beam can be orientated in any direction. The individual wires radiate symmetrically in the horizontal plane so that the resultant amplitude effect at a distant point due to $n$ such wires is $$A \frac{\sin n\gamma}{\sin \gamma}$$

when $A$ is the amplitude at this distance due to one wire and $2\gamma$ is the phase difference between waves arriving from two consecutive elements.

When the individual radiators themselves are directional in the plane of transmission or reception, for example a series of single horizontal wires or of wires bent at right angles at each half wavelength, the calculation of intensity distribution is more complicated; and when such individually directional aerial units have been combined they have hitherto been placed end to end or have had a purely arbitrary spacing.

If a plurality of devices, each symmetrically distributing wave energy, are co-related there is obtained, by interference, a selective distribution of energy having maxima in various directions. In Figure 7 of the accompanying drawing, there is shown diagrammatically a group of such devices $s, s$ co-related to give a principal maximum in the direction $s^1$ and sub-maxima in the direction $s^2$ and $s^3$. There are, therefore, minima, of which one in indicated at $f$, between $s^2$ and $s^3$. These directions depend upon, and can be determined by, the spacing and phasing of the devices $s, s$, and it will be understood that directional energy distributing devices, if substituted for the symmetrically distributing devices $s, s$, will be subject to the same conditions of interference which give rise to the various maxima and minima.

In Figure 8, there is shown diagrammatically a single directional device $d$ having an energy distribution with a principal maximum $d^1$ and directions $d^2$ and $d^3$ of first and second minima respectively. Between $d^2$ and $d^3$ there may be a sub-maximum, as indicated at $e$.

If now, a directional device such as $d$ is substituted for each device in the group $s, s$, of Figure 7, and if the spacing and phasing of the individual units be selected (as abovementioned) so that the directions $s^2$ and $s^3$ coincide with the directions $d^2, d^3$, it follows that the additive effects along the directions $s^2, s^3$, which would produce maximum values in these directions, are applied to the minima or zero values which exist in the directions $d^2, d^3$ of each individual device $d$.

Similarly, the minimum in the direction $f$, which is produced by interference in the group of devices $s, s$, eliminates the submaxima $e$ of the units $d$ when similarly grouped.

The principal maximum $d^1$ of each directional device coincides with the principal maximum $s^1$ of the group of devices.

The princples of interference involved in the above description are fundamentally those which are obtained with light waves when using the Michelson echelon grating, and in its broad aspect this invention consists in the application of this "echelon principle" to the transmission and reception of electromagnetic or wireless waves.

In the description which follows the terms "displacement" and "separation" of successive aerial units will be used. By "displacement" is meant a distance measured at right angles to the direction of maximum amplitude of the order given by dividing the wave length of the emitted or received radiation by $\sin a$ where $a$ is the angle between the direction of the principal diffraction maximum of a unit and the direction of the first minimum. By "separation" is meant the metrical path difference in the direction of the principal maximum between waves from corresponding points of successive units.

It has been found that by treating aerial units as simple point or line sources, and providing predetermined lateral "displacements," the "echelon principle" can be utilized to provide a highly directional effect for wireless radiation in the same way as it is obtained optically with the Michelson echelon grating. The effect can be made unidirectional through the elimination of backward radiation or reception by providing predetermined longitudinal "separations" between successive units.

According to the invention a directional system is provided comprising two or more similar aerial units individually possessing directional properties, each unit having a predetermined lateral "displacement" (as defined) with regard to the preceding unit perpendicular to the direction of maximum radiation of each of said units. Each unit may also have a predetermined longitudinal "separation" (as defined) with regard to the preceding unit parallel to the direction of maximum radiation of each of said units.

When the system is arranged for transmission, the waves from the units are adjusted to be in phase with each other or to have a constant phase difference. If desired the amplitudes of the waves from successive units can be varied in a predetermined manner, for example in a geometric ratio, to eliminate or reduce secondary maxima (though this may result in a slight widening of the beam in the direction of the principal maximum.)

When the phase difference and the "separation" between successive units are adjusted to give an effective retardation of one or more wave lengths, the direction of the principal maximum can be altered slightly by varying the frequency of the exciting oscillations. If the phase difference is chosen to compensate for the separation, that is to give zero phase difference between the waves from successive units, this dispersion effect disappears and two or more radiations of different frequencies can be projected from the transmitter in the same direction.

The angle of the direction of maximum radiation in the vertical plane can be varied by introducing small differences of phase between the waves from successive units, or by mechanically inclining the units when they consist of substantially vertical wires.

The radiation from the system as a whole becomes completely unidirectional if the "separation" between successive units is made a quarter of a wave length or an odd multiple thereof, the units being excited by oscillations having a phase difference of 90° or an odd multiple thereof. This direction can be reversed without mechanical rotation of the system, by reversing the sign of the phase difference between successive units.

In order that the invention can be fully understood it will now be described with further reference to the accompanying drawing in which Figure 1 is a diagrammatic plan view of a plurality of similar aerial units arranged according to the invention; Figure 2 is a sectional side elevation of a modified arrangement. Figure 3 is a plan view of Figure 2; and Figures 4, 5 and 6 are diagrammatic views of further modifications. Figures 7 and 8 have already been described.

Referring now to Figure 1 of the accompanying drawing, AB, CD and EF represent separate but similar aerial units individually possessing directional properties and arranged in echelon formation and fed from a common generator. The individual unit such as AB in the diagram may be any suitable plane or volume radiator having some directional effect, with or without a screening curtain or grid and its separate parts may be fed in series or parallel or a combination of the two in the well known manner.

The direction of the principal diffraction maximum of the unit AB is indicated by AN and the direction of the first minimum by AP. The angle therebetween is $a$. The "displacement" between the units AB and CD is shown by AQ where $$AQ = \frac{\text{wavelength}}{\sin a}$$

(When $a$ is small this expression reduces to $$\frac{\text{wavelength}}{a \text{ (radians)}}$$

AQ is always greater than 1). The "separation" is shown by QC, and is as stated the metrical path difference in the direction AN between waves from corresponding points of AB and CD. QC may be any predetermined fraction or multiple of a wavelength. If however the unit AB of Fig. 1 were so constructed that the direction of its principal maximum was along AQ instead of AN then QC would be the lateral "displacement" and AQ the longitudinal "separation".

If there are one or more further units such as that indicated at EF, the "separation" therebetween is the same as that between AB and CD. The phase difference between successive units is arranged to be zero or any constant value. In the special case when the various elements forming AB radiate with uniform amplitude in the same phase, AN is perpendicular to AB, Q coincides with B and BC is perpendicular to AB, but, of course, this invention is not intended to cover the limiting arrangement of this special case where the separation is zero and which provides a simple coplanar arrangement. Unless each aerial unit such as AB be provided with a screening grid or wires the whole system will, in general, radiate in both the forward and the reverse directions except when the units are constructed in the manner hereinafter described.

If however the phase difference between the successive units is made 90°, 270° or any odd multiple of 90° and the separation be made one quarter of a wave length or any odd multiple of this, the radiation becomes unilateral, that in the reverse direction cancelling out by interference, although each individual unit may radiate in both the forward and the reverse direction.

When the total effective retardation between the waves from successive units, the retardation depending both on the path and phase differences, does not exceed one wave length, a unit can be displaced from its position CD as above described to another position indicated by C'D', where CC' is not greater than one wave length, the next unit (if any) having a similar displacement relative to the preceding one. This enables a still narrower resultant beam to be obtained without introducing any more principal diffractional maxima.

Referring now to Figs. 2 and 3 LM is a unit having directional properties. It comprises two similar horizontal wires having a "displacement" as defined, and a "separation" as defined of a quarter of a wavelength in both the horizontal and the vertical planes. When the wire M is excited 90° in phase ahead of the wire L, the radiation in the vertically upward direction and the horizontal indicated by the arrow, has double the amplitude of the radiation from a single wire, whilst the radiation in the downward direction as well as the earth induction effects are a minimum.

The other unit RS has the same relative dimensions as the unit LM when it is excited in a similar manner it radiates in the same way as LM. The two units are combined with a "displacement" (as defined) and any desired "separation". The loss of energy through radiation in the upward direction can be avoided by making the wire R 180° out of phase with the wire L, and choosing the "separation" so that the wires L and R reinforce one another in the direction of the arrow.

The system described with reference to Figures 2 and 3 may be modified by disposing the wires L and M alone or together with the wires R and S vertically or at any angle to the vertical. Alternatively the elements of one unit may be disposed in one azimuth such as the vertical plane, while those of another unit are disposed in the horizontal plane.

In a further modification each unit may comprise two or more groups of wires having "displacements" and if desired "separations" in any plane, while the units considered as a whole may have "displacements" and if desired "separations" in any other plane, whereby the resulting beam may be readily oriented. The directions of the "displacements" and "separations" in said planes are of course chosen perpendicular and parallel respectively to the direction of maximum radiation of each of said units. For example each unit may have its "displacements" and "separations" in the horizontal plane, while the units as a whole have "displacements" and "separations" in the vertical plane.

Referring now to Figures 4 and 5, AB is a vertical wire which radiates in the principal direction ON, and CE is a second part which is of equal length and parallel to AB. Its position is found by drawing a line BD of a length equal to the displacement, the line BD being perpendicular to ON, and CE being so placed that the perpendicular distance of E from D is a quarter of a wave length or some odd multiple of this value. The ends B and C are joined through a variable inductance L the value of which is chosen so that the phase difference between the radiations from corresponding points of AB and CE is 90° or some odd multiple of this value.

As in the case considered in Figure 4, when the total effective retardation between the parts does not exceed one wave length CE may as before be displaced further, parallel to BD, to sharpen the beam in the vertical plane without introducing additional principal maxima. C' E' in Figure 5 shows such displacement.

Figure 6 is a perspective diagram of an array of equispaced elements as in Figure 4 with a separation not greater than a wave length. When these are fed with high frequency oscillations of the same phase, there is in effect a two unit system, one consisting of the coplanar array ABLK and another similar coplanar array CDNM displaced both behind and above it. This used by itself will give a narrow, unidirectional beam. It can however be regarded as a single unit and combined with other similar units to obtain still closer directional effects.

In all the arrangements hereinbefore mentioned the small effect of electrical interaction between the various parts can be compensated for by small departures from the given phase and "separation" values.

For the sake of clearness, the method of feeding the various parts has been omitted. To avoid loss of energy due to radiation from the feed wires, the energy can be supplied to each part by a high potential, low current supply which is suitably transformed or stepped down at the radiators in the well known manner. Alternatively, the energy may be carried along two close parallel wires the phases of which are 180° apart. The distance between the wires is chosen so that the sum of the loss due to condenser action, which decreases with increased separation of the wires and the loss due to radiation, which increases with increased separation, should be a minimum. This method can be combined with the well known method to render the loss in the feed supply wires negligible.

It will be understood that the various systems described above can be used as receivers when the generator is replaced by a suitable receiving instrument.

I claim:—

1. A directional aerial system for the transmission or reception of electromagnetic waves comprising a plurality of similar aerial units individually possessing directional properties each unit having a predetermined lateral "displacement" with regard to the preceding unit perpendicular to the direction of the maximum radiation of each of said units, said "displacement" being of the order of one wave length of the transmitted or received radiation divided by the sine of the angle between the direction of the principal diffraction maximum of a unit and the direction of the first minimum.

2. A directional aerial system as claimed in claim 1 in which each aerial unit has a predetermined longitudinal "separation" with regard to the preceding unit parallel to the direction of maximum radiation of each of said units.

3. A directional aerial system as claimed in claim 1 in which each unit comprises aerial elements having predetermined "displacements" in any plane while the units as a whole have predetermined "displacements" in any other plane.

4. A directional aerial system as claimed in claim 1 in which each aerial unit has a predetermined longitudinal "separation" with regard to the preceding unit parallel to the direction of maximum radiation of each of said units, and each unit comprises aerial elements having predetermined "displacements" and "separations" in any plane while the units as a whole have predetermined "displacements" and "separations" in any other plane.

5. A directional aerial system as claimed in claim 1 in which each aerial unit has a predetermined longitudinal "separation" with regard to the preceding unit parallel to the direction of maximum radiation of each of said units, and each unit comprises aerial elements having predetermined "displacements" and "separations" in any plane while the units as a whole have predetermined "displacements" and "separations" in any other plane and in which the "separation" between successive units is approximately a quarter of a wave length, said units being adapted to be excited by oscillations having a phase difference of 90°.

6. A directional aerial system as claimed in claim 1 in which the total retardation given by the algebraic sum of the phase and path retardations between successive units amounts to one or more wave lengths whereby a variation of the direction of emission with frequency is obtained.

7. A directional aerial system for the transmission of electromagnetic waves comprising a plurality of similar aerial units individually possessing directional properties, each unit having a predetermined lateral displacement with regard to the preceding unit perpendicular to the direction of maximum radiation of each of said units, said displacement being substantially equal to one length wave of the transmitted radiation divided by the sine of the angle between the direction of the principal diffraction maximum of a unit and the direction of the first minimum, said system having a total retardation equal to zero, whereby the direction of emission is made independent of the frequency of the transmitted radiation.

8. A directional aerial system for the transmission or reception of electro-magnetic waves comprising a plurality of similar aerial units individually possessing directional properties, each unit having a predetermined lateral "displacement" with regard to the preceding unit perpendicular to the direction of maximum radiation of each of said units, said "displacement" being of the order of one wave length of the transmitted or received radiation divided by the angle in radians between the direction of the principal diffraction maximum of a unit and the direction of first minimum.

9. A directional aerial system for the transmission or reception of electro-magnetic waves comprising a plurality of similar aerial units individually possessing directional properties, each unit having a predetermined lateral "displacement" with regard to the preceding unit perpendicular to the direction of maximum radiation of each of said units, said "displacement" being of the order of one wave length of the transmitted or received radiation divided by the angle in radians between the direction of the principal diffraction maximum of a unit and the direction of first minimum, and each aerial unit having a predetermined longitudinal "separation" with regard to the preceding unit parallel to the direction of maximum radiation of each of said units.

In testimony whereof I affix my signature.

WILLIAM EWART WILLIAMS.